United States Patent
Cox et al.

(10) Patent No.: US 12,159,368 B2
(45) Date of Patent: Dec. 3, 2024

(54) SYSTEMS AND METHODS FOR AUTOMATED IMAGE-BASED AUDITING OF EQUIPMENT CABINETS

(71) Applicant: JPMORGAN CHASE BANK, N.A., New York, NY (US)

(72) Inventors: Jacob Cox, Littleton, CO (US); Robert S. Newnam, Wilmington, DE (US); Zhen Du, Brooklyn, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 626 days.

(21) Appl. No.: 17/354,897

(22) Filed: Jun. 22, 2021

(65) Prior Publication Data

US 2021/0398248 A1    Dec. 23, 2021

Related U.S. Application Data

(60) Provisional application No. 63/042,306, filed on Jun. 22, 2020.

(51) Int. Cl.
*G06T 3/4038*   (2024.01)
*G06N 20/00*   (2019.01)
*H04L 67/12*   (2022.01)

(52) U.S. Cl.
CPC ............ *G06T 3/4038* (2013.01); *G06N 20/00* (2019.01); *H04L 67/12* (2013.01); *G06T 2207/10048* (2013.01); *G06T 2207/10052* (2013.01)

(58) Field of Classification Search
None
See application file for complete search history.

(56) References Cited

U.S. PATENT DOCUMENTS

| 7,072,739 B2 * | 7/2006 | Bash ............ H05K 7/1498 901/3 |
| 2013/0242137 A1 * | 9/2013 | Kirkland ............ G01C 3/12 348/371 |

(Continued)

OTHER PUBLICATIONS

Friedel, R., Figuerola, O., Kalva, H. et al. Asset identification using image descriptors. Multimed Tools Appl 73, 2201-2221 (2014). doi: 10.1007/s11042-013-1688-1 (Year: 2014).*

(Continued)

*Primary Examiner* — Vu Le
*Assistant Examiner* — Charles C L Penny
(74) *Attorney, Agent, or Firm* — GREENBERG TRAURIG LLP

(57) ABSTRACT

An electronic device for automated image-based auditing of equipment cabinets may include a memory storing an imaging computer program; and a computer processor. The imaging computer program, when executed by the computer processor, may cause the computer processor to perform the following: receive a plurality images from an image capture device on a carriage, wherein the image capture device is configured to traverse an equipment cabinet and capture the plurality of images of equipment in the equipment cabinet; generate a single image by stitching the plurality of images together; receive data from a sensor on the carriage, wherein the sensor is configured to capture data from the equipment in the equipment cabinet; associate the data with a location in the equipment cabinet; compare the single image and the data to an expected image and expected data; and output a result of the comparison.

20 Claims, 3 Drawing Sheets

(56) References Cited

U.S. PATENT DOCUMENTS

2017/0351239 A1* 12/2017 Wilder .................. B25J 9/1687
2020/0081439 A1* 3/2020 Mukherjee .............. B25J 5/007
2021/0211583 A1* 7/2021 Moore .................. H04N 23/56

OTHER PUBLICATIONS

Horvath, J. (2014). The Desktop 3D Printer. In: Mastering 3D Printing. Apress, Berkeley, CA. ISBN 978-1-4842-0025-4 (Year: 2014).*

R. Friedel, O. Figuerola, H. Kalva, and B. Furht, "Asset identification using image descriptors," Multimedia Tools and Applications, vol. 73, No. 3, pp. 2201-2221, Sep. 2013. doi:10.1007/s11042-013-1688-1 (Year: 2013).*

\* cited by examiner

SYSTEMS AND METHODS FOR AUTOMATED IMAGE-BASED AUDITING OF EQUIPMENT CABINETS

RELATED APPLICATIONS

This application claims priority to, and the benefit of, U.S. Provisional Patent Application 63/042,306, filed Jun. 22, 2020, the disclosure of which is hereby incorporated, by reference, in its entirety.

BACKGROUND OF THE INVENTION

1. Field of the Invention

Embodiments relate generally to systems and methods for automated image-based auditing of equipment cabinets.

2. Description of the Related Art

Auditing of physical labels, cables, devices, etc., in data center cabinets is extremely time consuming and error prone, and takes place in all data centers across the globe. For example, a standard audit on a data center cabinet before shipping may include confirming that: labels are in the correct locations; labels are correct size, font, color, etc.; hostnames match source of record (e.g., EDI, DCIM tool); hostnames appear in proper numerical order; asset numbers match source of record; serial numbers match source of record; RFID tags match source of record; equipment models match source of record; all hard disk drives (HDDs) are accounted for; all blades or modules are in place; all power supplies are in place; correct airflow kits are installed in equipment (e.g., front to back/back to front/side breathing); proper air shroud kits installed, if required; Small Form-Factor Pluggable (SFP) modules accounted for and in place; Power Distribution Units (PDUs) are in the correct place and orientation; power cords are properly color coded (e.g., White "A", Black "B"); PDUs breakers need to be tripped/open position; equipment connected to the assigned PDU receptacles; bend radius on cabling is within specifications; cabling is color coded to standards; cable management is acceptable; no visible damage on equipment; shipping screws and indicators removed on equipment and cabinet; all screws, bolts, or securing devices accounted for; equipment is in assigned rack unit; health indicating LEDs show positive health; equipment cable connections are in place and active/up; correct cabinet accessories and cable managers in place.

Data cabinets are often built by a third party, and it is virtually impossible to observe every label, cable, connection, build pattern, using existing resources before shipping or after receipt.

SUMMARY OF THE INVENTION

Systems and methods for automated image-based auditing of equipment cabinets are disclosed. In one embodiment, a system may include a frame comprising a base, a top support, and a plurality of vertical supports; a gantry movably received on the vertical supports, wherein the gantry is movable in a vertical direction; a carriage movably received on the gantry, wherein the carriage is movable in a horizontal direction, the carriage comprising: a plurality of sensors received on the carriage, wherein at least one of the plurality of sensors comprises an imaging device that captures a plurality of images of equipment for an equipment cabinet in an equipment cabinet build and a sensor that captures data from the equipment in the equipment cabinet build; a motor that moves the carriage in the horizontal direction; and a controller that controls operation of the imaging device and the plurality of sensors and the motor; and an imaging computer program executed on a computing device that is configured to: receive the plurality of images and stitch the plurality of images together to form a single image of the equipment cabinet; receive the data and associate the data with a location on the equipment cabinet; compare the single image and the data to an expected image and expected data for the equipment cabinet build; and output a result of the comparison.

In one embodiment, the imaging device may be a daylight camera or a thermal imaging camera.

In one embodiment, the plurality of sensors may include one or more of a Radio Frequency Identifier (RFID) reader, a barcode scanner, a temperature sensor, a humidity sensor, a light sensor, a velometer, an anemometer, a non-contact voltage tester, a hall effect sensor, a Light Detection and Ranging (LIDAR) sensor, a ultrasonic sensor, a Near Field Communication (NFC) reader, etc.

In one embodiment, the controller may receive information for the equipment cabinet build and controls the operation of the plurality of sensors and the motor based on the information for the equipment cabinet build.

In one embodiment, the imaging computer program may also generate a composite image comprising the single image and the data from the sensors.

In one embodiment, the expected image may be based on machine learning from imaging at least one prior equipment cabinet, may be based on build information for the equipment cabinet build received by the imaging computer program, etc.

In one embodiment, the carriage may be configured to tilt and/or pan relative to the gantry.

According to another embodiment, a method may include: (1) controlling, at a controller, a carriage to move relative to an equipment cabinet; (2) controlling, by the controller, an imaging device to capture a plurality of images of equipment in the equipment cabinet; (3) controlling, by the controller, at least one sensor to capture data from the equipment in the equipment cabinet; (4) communicating the plurality of images and the data to an imaging computer program. The imaging computer program may be configured to (a) receive the plurality images and stitch the images together to form a single image of the equipment cabinet; (b) receive the data and associate the data with a location on the equipment cabinet; (c) compare the single image and the data to an expected image and expected data for an equipment cabinet build; and (d) output a result of the comparison.

In one embodiment, the imaging device may be a daylight camera or a thermal imaging camera.

In one embodiment, the plurality of sensors may include one or more of a Radio Frequency Identifier (RFID) reader, a barcode scanner, a temperature sensor, a humidity sensor, a light sensor, a velometer, an anemometer, a non-contact voltage tester, a hall effect sensor, a Light Detection and Ranging (LIDAR) sensor, a ultrasonic sensor, a Near Field Communication (NFC) reader, etc.

In one embodiment, the controller may receive information for the equipment cabinet build and controls operation of the plurality of sensors and a motor based on the information for the equipment cabinet build.

In one embodiment, the imaging computer program may be further configured to generate a composite image comprising the single image and the data from the sensors.

In one embodiment, the expected image may be based on machine learning from imaging at least one prior equipment cabinet, may be on build information for the equipment cabinet build received by the imaging computer program, etc.

According to another embodiment, an electronic device may include a memory storing an imaging computer program; and a computer processor. The imaging computer program, when executed by the computer processor, may cause the computer processor to perform the following: receive a plurality images from an image capture device on a carriage, wherein the image capture device is configured to traverse an equipment cabinet and capture the plurality of images of equipment in the equipment cabinet; generate a single image by stitching the plurality of images together; receive data from a sensor on the carriage, wherein the sensor is configured to capture data from the equipment in the equipment cabinet; associate the data with a location in the equipment cabinet; compare the single image and the data to an expected image and expected data; and output a result of the comparison.

In one embodiment, the expected image may be based on machine learning from imaging at least one prior equipment cabinet, may be based on build information for an equipment cabinet build, etc.

In one embodiment, the imaging device may be a daylight camera or a thermal imaging camera.

In one embodiment, the plurality of sensors may include one or more of a Radio Frequency Identifier (RFID) reader, a barcode scanner, a temperature sensor, a humidity sensor, a light sensor, a velometer, an anemometer, a non-contact voltage tester, a hall effect sensor, a Light Detection and Ranging (LIDAR) sensor, a ultrasonic sensor, and a Near Field Communication (NFC) reader.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments relate generally to systems and methods for automated image-based auditing of equipment cabinets.

Embodiments may include a system that consists of a frame supporting a gantry along the X-axis that may include one or more of many components (e.g., a daylight camera, a thermal imaging camera (e.g., a FLIR Systems camera), a RFID reader, a barcode scanner, a temperature sensor, a humidity sensor, a light sensor, a velometer, an anemometer, a non-contact voltage tester, a hall effect sensor, a Light Detection and Ranging (LIDAR) sensor, a ultrasonic sensor, a NFC reader, etc.) to assist in the equipment cabinet audit process. The gantry may move in the Z-axis (i.e., vertically), and a carriage may move along the X-axis (i.e., horizontal). The carriage may include the ability to pan and/or tilt.

In one embodiment, the system may be placed on a platform that may be moved or travels between equipment cabinets. In one embodiment, the system may be manually moved between equipment cabinets, may be self-propelled, etc. In another embodiment, the system may be stationary, and the equipment cabinets or equipment may be moved to the system.

In one embodiment the carriage may be provided with an extensible arm or appendage. The extensible arm or appendage may have sensors attached.

Embodiments may provide predictably captured images in data across builds. Images and sensor data may be localized to known coordinates in a build. Specific information may be quickly extracted and passed to internal or external systems for storage or analysis.

Embodiments may use object detection, optical character recognition (OCR), sensor readings, etc., to verify correct make, model, components, locations, etc. Expensive detection/OCR/etc. may be performed on data extracted from defined allowable locations instead of run across entire builds images/sensors readings. This may result in a reduction of model training time and investment labeling datasets due to the use of consistent viewing angles, sensor readings, and build patterns.

Embodiments may use multiple sensors which provides additional verification of builds using visible and non-visible cues. For example, an image capture device may determine if fans installed in equipment are directing airflow correctly, and FLIR sensors may make such a determination based upon expected and real thermal values. Embodiments may combine data from multiple sensors as necessary and/or desired.

An artificial intelligence (AI) and/or machine learning (ML) model may be specific to a specific component, make, model, sensor, or other data and provided input tailored to the model allowing increased confidence with fewer extraneous factors slowing down the model or decreasing confidence. The AI/ML models may be incrementally trained, and re-used across multiple builds as appropriate reducing the need for models to be trained on entire build patterns and or rebuilt/retrained as requirements change.

Figure 1:
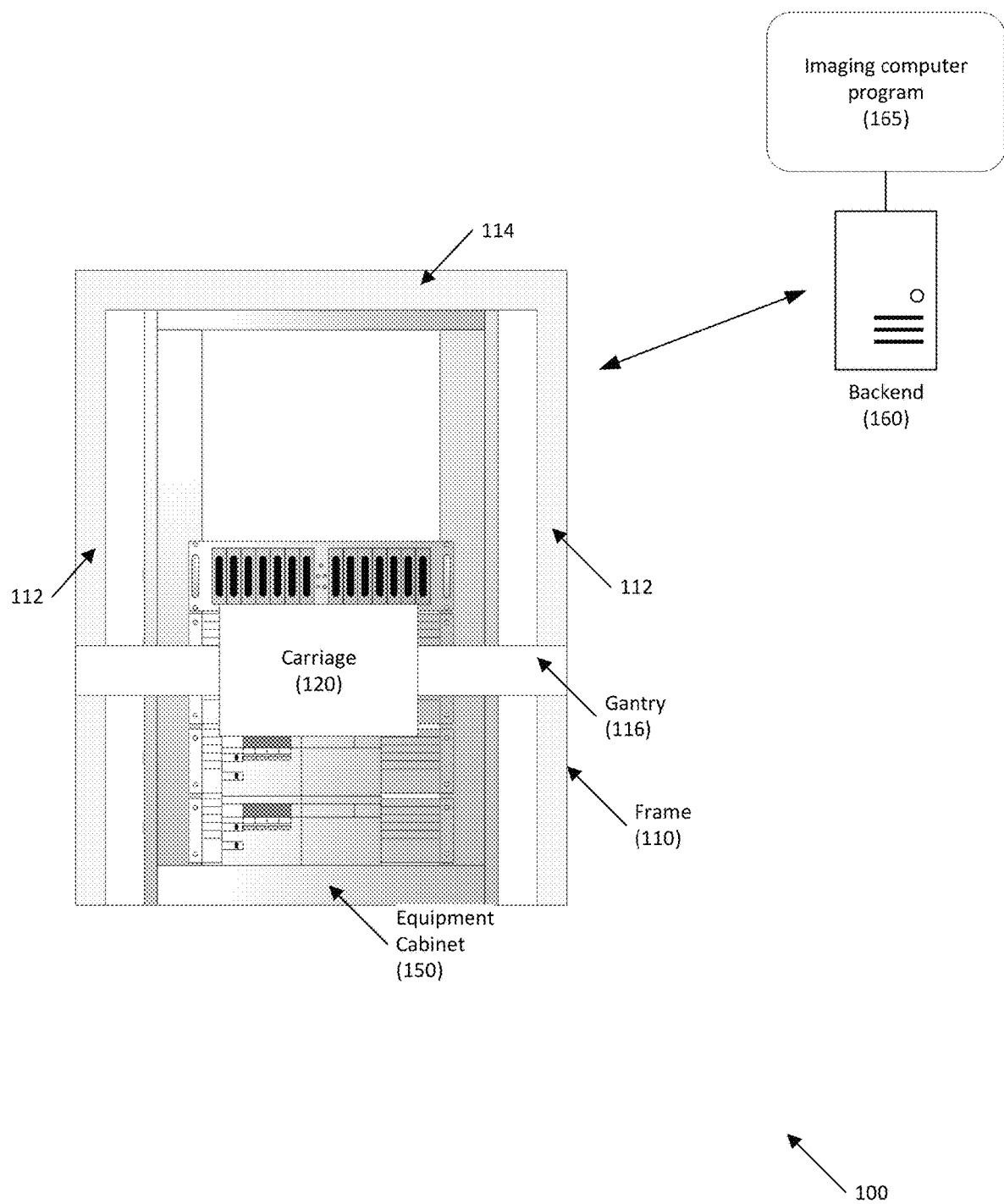
FIG. 1 is an exemplary depiction of a system for automated image-based auditing of equipment cabinets according to an embodiment.

Referring to FIG. 1, a system for automated image-based auditing of equipment cabinets is disclosed according to one embodiment. System 100 may include frame 110 that may be positioned in front of equipment cabinet 150. Equipment cabinet may include, for example, rack-mountable computer equipment (e.g., power supplies, routers, servers, storage, etc.). Frame 110 may include two or more vertical supports 112, top support 114, base (not shown), gantry 116, and carriage 120. In one embodiment, gantry 116 may be movably mounted on vertical supports 112 in any suitable manner and may move vertically relative to equipment cabinet 150. For example, gantry 116 may be moved by belt drive, a leadscrew, a ball screw, a linear actuator, a belt and pinion, a rack and pinion, or any other suitable mechanism.

Gantry 116 may further provide an ability to tilt toward and/or away from the equipment in equipment cabinet 150.

Carriage 120 may be movably mounted on gantry 116 and may move horizontally relative to gantry 116. For example, carriage 120 may be moved by belt drive, a leadscrew, a ball screw, a linear actuator, a belt and pinion, a rack and pinion, or any other suitable mechanism. In one embodiment, one or more motors (not shown) may be provided at the ends of gantry 116 for movement on vertical supports 112. In another embodiment, the motors may be provided on vertical supports 112, or elsewhere on frame 110.

Carriage 120 may include one or more sensors that may image and/or capture data and information from equipment cabinet 150 including the equipment in equipment cabinet 150. An example of a sensor is a daylight camera that takes high quality images of the cabinet. The camera may move along the X axis taking pictures along the X and Z-axis of the frame. The daylight camera may pan, tilt, or rotate to allow taking images of items not visible from a parallel plane. Another example of a sensor is a thermal imaging camera that takes thermal images of the cabinet. The thermal imaging may be used to recognize patterns and problems, measure expected temperatures versus unusual temperatures, and determine if cabling can be changed or needs to be changed to allow proper airflow and temperature regulation. Another example of a sensor is a RFID sensor that may triangulate or locate the location of each RFID tag to provide rack unit level accuracy of active and passive RFID tagging systems. Another example of a sensor is a barcode scanner used to scan equipment barcodes. Another example of a sensor is a temperature sensor to detect the inlet and outlet temperatures, and calibrate other onboard sensors. Another example of a sensor is a humidity sensor to detect the inlet and outlet humidity, and calibrate other onboard sensors. Another example of a sensor is a light sensor to detect ambient light levels, and calibrate other onboard sensors. Another example of a sensor is a velometer to measure the volume of airflow into or out of equipment. Another example of a sensor is an anemometer to measure the velocity of airflow at equipment inlets and outlets. Another example of a sensor is a non-contact voltage tester to determine if power circuits are energized. Another example of a sensor is a hall effect sensor to measure AC or DC current at PDU's or equipment power cords. Another example of a sensor is a LIDAR sensor to map the three-dimensional space inside the cabinet and ensure any operations with extending portions of the carriage do not make contact with objects inside the cabinet. Another example of a sensor is an ultrasonic sensor to measure distance between system components and cabinet components or equipment that may be used to prevent collisions between extensible components and equipment. Another example of a sensor is an NFC sensor to read NFC tagged devices, cables, components or other items. These sensors are illustrative only; different and/or additional sensors may be included as is necessary and/or desired. Notably, the sensors used may depend on the build information for equipment cabinet 150. For example, based on the build information, the appropriate sensors may be selected to perform the desired data collection, the type of audit task, etc.

Carriage 120 may have sensors or cameras affixed in any suitable fashion. Sensors and cameras may be interchangeable using, for example, pogo pins, magnets, quick connectors, wiring harnesses, or any other mechanism allowing the sensors to be added, removed, or interchanged to complete an audit task.

In one embodiment, carriage 120 may further move in the Y direction (e.g., toward or away from equipment cabinet 150). For example, carriage may include one or more actuator (not shown) or axis (not shown) to allow for movement of one or more sensor toward or away from equipment cabinet 150.

System 100 may further include backend 160, which may execute imaging computer program 165 that may perform imaging processing. In one embodiment, backend 160 may be a physical server, a cloud-based server, combinations thereof, etc. In one embodiment, imaging computer program may receive image and/or sensor data from camera(s) and/or sensor(s) on carriage 120 and may "stitch" together the images to form a complete image of the equipment in equipment cabinet 150. In one embodiment, each image taken by the cameras may have a known size, and may be taken at a known position, allowing the images to be stitched together.

For example, sensors and images may be stitched using carriage coordinates and specific camera or sensor field of view by appending/extending images.

In one embodiment, imaging computer program 165 may generate a composite image comprising data from a plurality of camera(s) and/or sensor(s). For example, a composite image may include an image taken by daylight camera and data sensed by a RF sensor.

In one embodiment, imaging computer program 165 may further control the operation of carriage 120, including the movement of carriage 120, the operation of the camera(s) and sensor(s), etc. For example, imaging computer program 165 may apply machine learning to identify when to turn certain cameras on or off, where certain signals (e.g., RF data) should be detected, etc.

Figure 2:
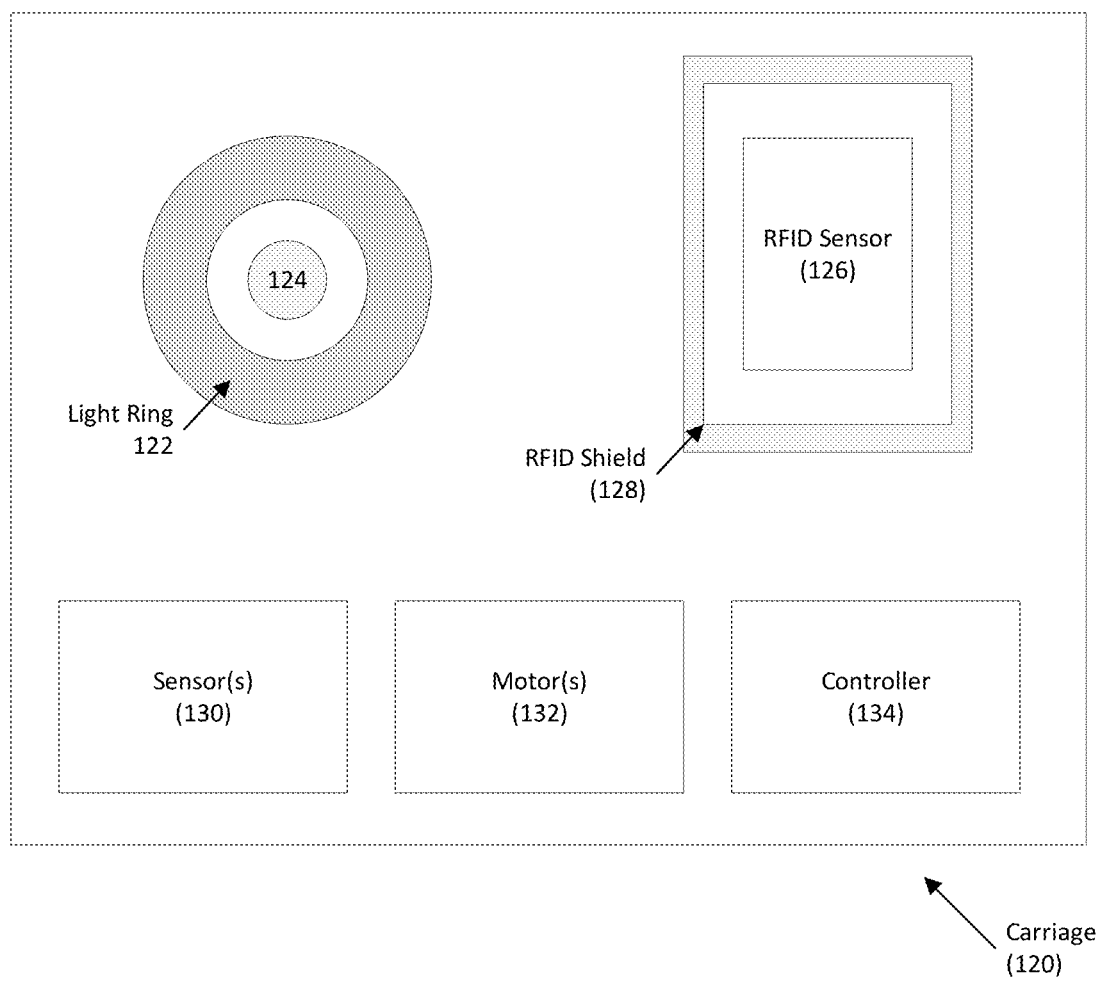
FIG. 2 is an exemplary view of a carriage according to one embodiment.

Referring to FIG. 2, an exemplary carriage is provided according to an embodiment. In one embodiment, carriage 120 may include light ring 122, which may provide visible and/or IR light; camera 124, which may be a daylight camera. Carriage 120 may further include sensor 126, such as a RFID sensor, and shield 128, such as RFID shield, to detect RFID elements. Other sensors 130, such as those identified above, may be provided as is necessary and/or desired.

Carriage 120 may further include one or more motor 132. Motor 132 may be any suitable motor, such as stepper motors. Motor(s) 132 may control movement of carriage 120 in the horizontal direction, the tilt of carriage 120, etc.

Carriage 120 may further include controller 134, which may be any suitable controller for controlling any of light ring 122, camera 124, RFID sensor 126, sensor(s) 130, and motor(s) 132. For example, controller 134 may execute a computer program that causes carriage 120 to traverse equipment cabinet 150 and collect images and other data.

Figure 3:
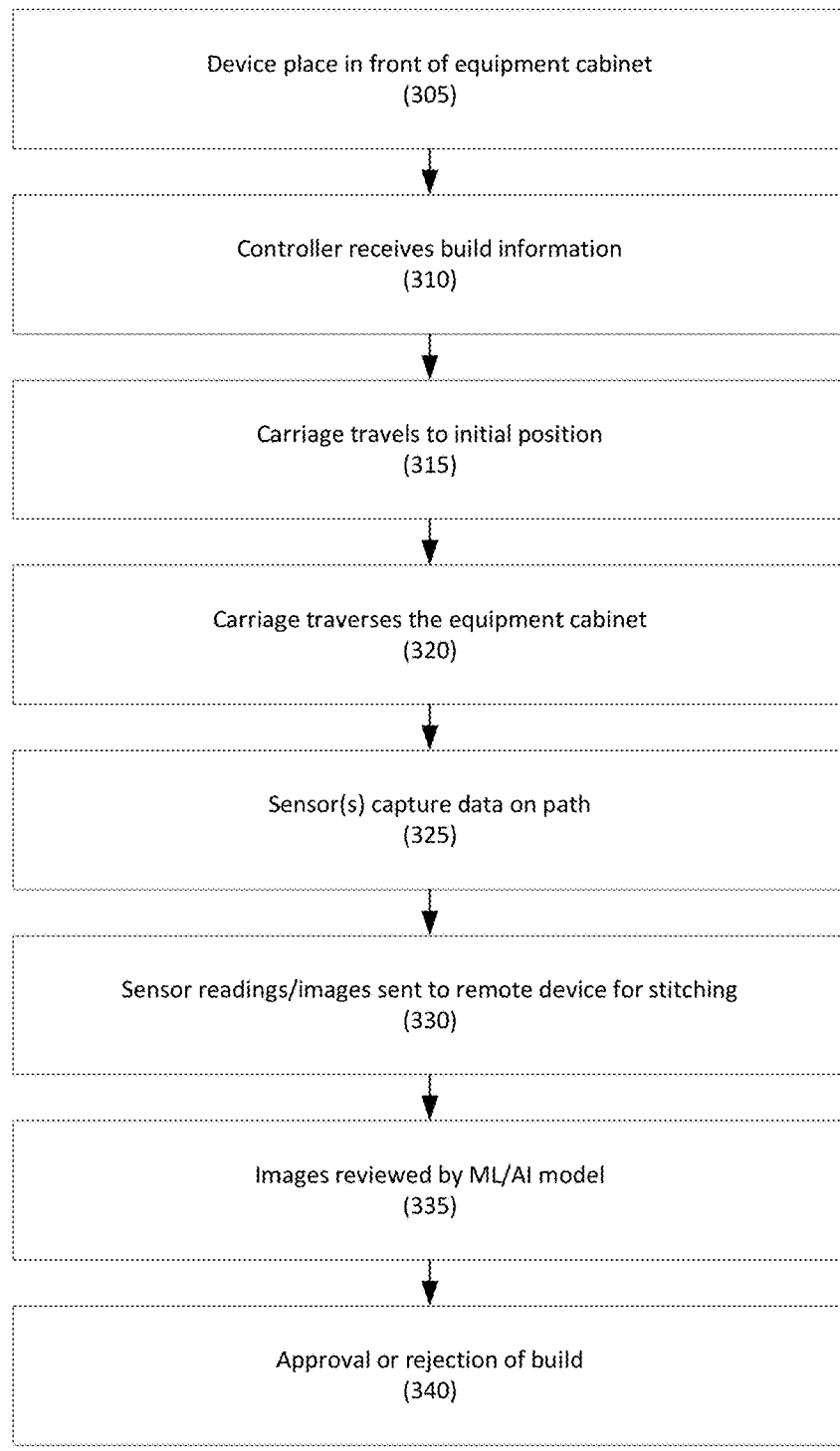
FIG. 3 depicts a method for automated image-based auditing of equipment cabinets according to one embodiment.

Referring to FIG. 3, a method for automated image-based auditing of equipment cabinets is disclosed according to one embodiment. In step 305, a device may be placed in front of an equipment cabinet. Alternatively, the equipment cabinet may be moved in front of the device.

In step 310, a controller for the device may receive build information. In one embodiment, the build information may be manually entered, may be scanned (e.g., from a bar code, etc.), may be received from a file, etc. In one embodiment, the build information may include information regarding the type of equipment cabinet (e.g., manufacturer, dimensions, etc.), types of location of equipment in the equipment cabinet, expected locations for tags, cable locations, parameters (e.g., airflow, etc.), and any other information as is necessary and/or desired.

In embodiments, the build information may include information that may be used with predetermined bounding box methods to increase detection probability and accuracy. For example, the controller may receive coordinates for bounding boxes to enhance detection probabilities and specify sensor use or training model use from an internal record based upon the engineered build, the make/model of devices found in the source of record, existing standard and procedures, or other mechanism.

The process for identifying bounding boxes may be used for one or more of the items being audited. For example, the equipment in the equipment cabinet may have a known RU or location, and the coordinates may be converted to absolute coordinates based off the homing position of the device axes within the equipment cabinet being audited.

In another embodiment, if the specifics of the equipment cabinet or the equipment is unknown, embodiments may store coordinates, and methods may be used to identify key points or auditable features to find the most probable match based upon the coordinates available in the bounding box database. This information may be used to identify specific equipment in a build, to identify if the equipment cabinet build is identical or similar to other builds to aid in categorizing, etc.

In step 315, the carriage may travel to an initial position. For example, the carriage may be positioned at one corner of the frame by the carriage moving to one end of the gantry, and the gantry moving to a top or bottom of the frame. The initial position may be selected as is necessary and/or desired, and other positions may be used as is necessary and/or desired.

In step 320, the carriage may traverse the equipment cabinet. For example, the carriage may move along the X-axis and may move up or down the frame in an orderly manner.

According to an embodiment, the movement of the carriage in the Z-axis, X-axis, and/or Y-axis may be follows:

The Z-axis movement may be accomplished using a belt drive, a leadscrew, a ball screw, a linear actuator, a belt and pinion, a rack and pinion, or any other suitable mechanism. The Z-axis may be homed by moving the X-axis assembly to a limit switch or end stop to confirm the limit on desired travel range.

Movement along the Z-axis may be limited in software, limit maximum travel movement to avoid collisions or imaging of unnecessary portions of the object being audited.

Limit switches or end stops may rest upon the cabinet or object being imaged, to orientate the X-axis parallel to the object being audited. Limit switches may be optical, laser, ultrasonic, mechanical switches, or any acceptable mechanism of signaling a motion stop.

One or more directions of travel may use a listed mechanism of having movement restricted.

The Z-axis movement may use one or more motors, and each motor may be homed individually or in unison to orientate the X-axis to be perpendicular to the object being audited.

With regard to the X-axis, X-axis carriage movement may be accomplished using a belted drive, a leadscrew, a ball screw, a linear actuator, a belt and pinion, a rack and pinion, or any other acceptable mechanism.

The X-axis carriage movement may be homed by moving the X carriage assembly to a limit switch or end stop to confirm the limit on desired travel range.

The X-axis carriage may be limited in software, limit maximum travel movement to avoid collisions or imaging of unnecessary portions of the object being audited. Limit switches may be optical, laser, ultrasonic, mechanical switches, or any acceptable mechanism of signaling a motion stop.

The limit switches or end stops may rest upon the cabinet or object being imaged, to orientate the X-axis carriage parallel to the object being audited.

One or more directions of travel may use a listed mechanism of having movement restricted.

The X-axis carriage may further have a pan/tilt/rotate apparatus mounted between the carriage and sensors to allow for panning, tilting, and/or rotating of sensors and cameras.

The X-axis carriage may have an extensible appendage or arm that allows movement of sensors or cameras in the Y-axis and/or Z-axis.

With regard to Y-axis movement, the Y-axis may have a pan/tilt/rotate apparatus mounted on the end intended for taking readings to allow panning, tilting, and/or rotating of sensors and cameras. The Y-axis carriage movement may be accomplished using a belted Z-axis, a leadscrew, a ball screw, a linear actuator, a belt and pinion, a rack and pinion, or any other acceptable mechanism.

The Y-axis carriage movement may be homed by moving the Y carriage assembly to a limit switch or end stop to confirm the limit on desired travel range. Limit switches may be optical, laser, ultrasonic, mechanical switches, or any acceptable mechanism of signaling a motion stop.

The Y-axis carriage movement may have one or more ends tops affixed to the carriage, the X-axis, the X-axis carriage, or to the Y-axis extensible component to limit the movement of the Y-axis carriage.

One or more directions of travel may use a listed mechanism of having movement restricted.

The Y-axis carriage movement may include a pan/tilt/rotate apparatus mounted to allow panning, tilting, or rotating of sensors and cameras.

End stops, limit switches or other mechanisms of end of travel feedback may be allowed to slide on the apparatus or frame, and cease contact upon contact with the object being audited.

In step 325, one or more sensor on the carriage may capture data from the equipment cabinet. Certain sensors may capture certain data at certain locations based, for example, on the build information. For example, the camera may capture images of the entire equipment cabinet, while the FLIR may capture data for only a portion of the equipment cabinet.

In embodiments, the pan/tilt/rotate feature allows for the camera and other sensors to measure and record information from the cabinet without being restricted to viewing head-on from a parallel plane.

Embodiments may allow triangulation of items, such as RFID tags, allowing for more accurate location tagging unavailable in existing systems. For example, an RFID tag may be triangulated to a specific rack unit or location, even if the host RFID implementation does not have this capability.

In step 330, the sensor readings/images may be sent to a remote device, such as a server, for stitching. For example, the individual images and/or data may be combined to provide a representation of the equipment cabinet. In one embodiment images and sensor data may be combined (i.e., stitched together) to create high resolution images and sensor readings.

In step 335, the images and/or data may be reviewed by a ML and/or AI model. For example, the images and/or data may be compared to known existing patterns for prior scans, or may build initial patterns for future recognition. This data may be compared to other instances of the same build to ensure consistency in build and operation of systems.

In one embodiment, discrepancies between the current imaging and data and known imaging and data may be graphically highlighted and output.

In step 340, the build may be approved or rejected based on the review.

Embodiments may interact with DCIM tools or other systems and populate information, update information, or indicate where errors may exist.

Embodiments may navigate a datacenter and provide sensor readings and mapping of data across a facility.

Embodiments may be used to audit patch panels, switches, PDUs, or other equipment and make determinations of utilization or available capacities.

Although multiple embodiments have been described, it should be recognized that these embodiments are not exclusive to each other, and that features from one embodiment may be used with others.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A system, comprising:
a frame comprising a base, a top support, and a plurality of vertical supports;
a gantry movably received on the vertical supports, wherein the gantry is movable in a vertical direction;
a carriage movably received on the gantry, wherein the carriage is movable in a horizontal direction, the carriage comprising:
a plurality of sensors received on the carriage, wherein at least one of the plurality of sensors comprises an imaging device that captures a plurality of images of equipment in an equipment cabinet for an equipment cabinet build and a sensor that captures data from the equipment in the equipment cabinet build;
a motor mounted on the carriage that moves the carriage in the horizontal direction; and
a controller that controls operation of the imaging device and the plurality of sensors and the motor; and
an imaging computer program executed on a computing device that is configured to:
receive the plurality images and stitch the plurality of images together to form a single image of the equipment cabinet;
receive the data and associate the data with a location on the equipment cabinet;
compare the single image and the data to an expected image and expected data for the equipment cabinet build; and
output a result of the comparison.

2. The system of claim 1, wherein the imaging device comprises a daylight camera or a thermal imaging camera.

3. The system of claim 1, wherein the plurality of sensors comprise one or more of a Radio Frequency Identifier (RFID) reader, a barcode scanner, a temperature sensor, a humidity sensor, a light sensor, a velometer, an anemometer, a non-contact voltage tester, a hall effect sensor, a Light Detection and Ranging (LIDAR) sensor, a ultrasonic sensor, and a Near Field Communication (NFC) reader.

4. The system of claim 1, wherein the controller receives information for the equipment cabinet build and controls the operation of the plurality of sensors and the motor based on the information for the equipment cabinet build.

5. The system of claim 1, wherein the imaging computer program further generates a composite image comprising the single image and the data from the plurality of sensors.

6. The system of claim 1, wherein the expected image is based on machine learning from imaging at least one prior equipment cabinet.

7. The system of claim 1, wherein the expected image is based on build information for the equipment cabinet build received by the imaging computer program.

8. The system of claim 1, wherein the carriage is configured to tilt and/or pan relative to the gantry.

9. A method, comprising:
controlling, at a controller, a motor mounted on a carriage to move relative to an equipment cabinet;
controlling, by the controller, an imaging device to capture a plurality of images of equipment in the equipment cabinet;
controlling, by the controller, at least one sensor to capture data from the equipment in the equipment cabinet; and
communicating the plurality of images and the data to an imaging computer program;
wherein the imaging computer program is configured to:
receive the plurality images and stitch the plurality of images together to form a single image of the equipment cabinet;
receive the data and associate the data with a location on the equipment cabinet;
compare the single image and the data to an expected image and expected data for an equipment cabinet build; and
output a result of the comparison.

10. The method of claim 9, wherein the imaging device comprises a daylight camera or a thermal imaging camera.

11. The method of claim 9, wherein the plurality of sensors comprise one or more of a Radio Frequency Identifier (RFID) reader, a barcode scanner, a temperature sensor, a humidity sensor, a light sensor, a velometer, an anemometer, a non-contact voltage tester, a hall effect sensor, a Light Detection and Ranging (LIDAR) sensor, a ultrasonic sensor, and a Near Field Communication (NFC) reader.

12. The method of claim 9, wherein the controller receives information for the equipment cabinet build and controls the plurality of sensors and a motor based on the information for the equipment cabinet build.

13. The method of claim 9, wherein the imaging computer program further generates a composite image comprising the single image and the data from the sensors.

14. The method of claim 9, wherein the expected image is based on machine learning from imaging at least one prior equipment cabinet.

15. The method of claim 9, wherein the expected image is based on build information for the equipment cabinet build received by the imaging computer program.

16. An electronic device, comprising:
a memory storing an imaging computer program; and
a computer processor;
wherein the imaging computer program, when executed by the computer processor, causes the computer processor to perform the following:
receive a plurality of images from an image capture device on a carriage, wherein a motor mounted on the carriage is configured to move the image capture device to traverse an equipment cabinet and capture the plurality of images of equipment in the equipment cabinet;
generate a single image by stitching the plurality of images together;
receive data from a sensor on the carriage, wherein the sensor is configured to capture data from the equipment in the equipment cabinet;
associate the data with a location in the equipment cabinet;
compare the single image and the data to an expected image and expected data; and
output a result of the comparison.

17. The electronic device of claim 16, wherein the expected image is based on machine learning from imaging at least one prior equipment cabinet.

18. The electronic device of claim 16, wherein the expected image is based on build information for an equipment cabinet build for the equipment cabinet.

19. The electronic device of claim 16, wherein the image capture device comprises a daylight camera or a thermal imaging camera.

20. The electronic device of claim 16, wherein the comprises a Radio Frequency Identifier (RFID) reader, a barcode scanner, a temperature sensor, a humidity sensor, a light sensor, a velometer, an anemometer, a non-contact voltage tester, a hall effect sensor, a Light Detection and Ranging (LIDAR) sensor, a ultrasonic sensor, and a Near Field Communication (NFC) reader.

* * * * *